(12) United States Patent
Vashist

(10) Patent No.: US 12,396,583 B2
(45) Date of Patent: Aug. 26, 2025

(54) ENERGY EFFICIENT SMART MAILBOX

(71) Applicant: Aadvik Sudhir Vashist, Clarksville, MD (US)

(72) Inventor: Aadvik Sudhir Vashist, Clarksville, MD (US)

( * ) Notice: Subject to any disclaimer, the term of this patent is extended or adjusted under 35 U.S.C. 154(b) by 135 days.

(21) Appl. No.: 18/305,861

(22) Filed: Apr. 24, 2023

(65) Prior Publication Data

US 2023/0355021 A1    Nov. 9, 2023

Related U.S. Application Data

(60) Provisional application No. 63/334,402, filed on Apr. 25, 2022.

(51) Int. Cl.
  *A47G 29/14*   (2006.01)
  *E05B 47/00*   (2006.01)
  *G07C 9/00*    (2020.01)
  *H04Q 9/00*    (2006.01)

(52) U.S. Cl.
  CPC ........ *A47G 29/141* (2013.01); *E05B 47/0002* (2013.01); *G07C 9/00571* (2013.01); *H04Q 9/00* (2013.01); *A47G 2029/149* (2013.01); *E05B 2047/0058* (2013.01); *E05B 2047/0064* (2013.01); *E05B 2047/0067* (2013.01); *H04Q 2209/40* (2013.01); *H04Q 2209/886* (2013.01)

(58) Field of Classification Search
  None
  See application file for complete search history.

(56) References Cited

U.S. PATENT DOCUMENTS

| | | | |
|---|---|---|---|
| 5,790,015 A * | 8/1998 | Iitsuka | G07C 9/00182 340/425.5 |
| 7,175,071 B1 | 2/2007 | Slagle et al. | |
| 8,299,923 B2 | 10/2012 | Hammoud | |
| 9,336,667 B2 | 5/2016 | Hammoud | |
| 10,108,334 B2 * | 10/2018 | Lee | B60K 35/80 |
| 11,185,183 B2 * | 11/2021 | Knox | A47G 29/141 |

FOREIGN PATENT DOCUMENTS

| | | |
|---|---|---|
| KR | 20160093662 A | 8/2016 |
| WO | WO-2016164577 A1 | 10/2016 |

OTHER PUBLICATIONS

Adafruit Mailbox Notification Service: Overview, pp. 1-16, URL: https://learn.adafruit.com/mailbox-notification-service [retrieved online Apr. 19, 2023] (2015).

BenchSentry Connect—Secure Package Delivery Porch Box, GenieCompany.com, pp. 1-9, URL: https://store.geniecompany.com/products/benchsentry-secure-package-delivery-porch-box?variant=40574911152323&currency=USD&utm_medium=product_sync&utm_source=google&utm_content=sag_organic&utm_campaign=sag_organic&cmp_id=13765910534&adg_id=124588326659&kwd=&device=c&gclid=EAIaIQobChMItp6Hks7-8glVB4zlCh1ljQxpEAQYAyABEglMfPD_BwE [retrieved online Apr. 19, 2023].

(Continued)

*Primary Examiner* — Carlos Garcia
(74) *Attorney, Agent, or Firm* — WILSON SONSINI GOODRICH & ROSATI

(57) ABSTRACT

The present disclosure describes a method for operating a mailbox, the method comprising: detecting a motion in proximity to the mail box; engaging a lock based at least partially on the detecting of the motion; and disengaging the lock after a predetermined amount of time has passed after detecting of the motion, in the absence of detecting additional motion.

12 Claims, 3 Drawing Sheets

(56) References Cited

OTHER PUBLICATIONS

Danby 3.7 cu. ft. Parcel Guard Smart Mailbox in Black, Danby.com, pp. 1-4, URL: https://www.danby.com/en-us/products/niche-en-US/parcel-guard-smart-mailbox-black/ [retrieved online Apr. 19, 2023].

The DeliverySafe: Lockable Delivery Box, DeliverySafe.com, pp. 1-6, URL: https://deliverysafe.com/products/the-deliverysafe?variant=37667148333234&campaignid=13951780782&adgroupid=122824819417&adid=534539781263&gclid=EAlalQobChMltp6Hks7-8glVB4zlCh1ljQxpEAQYASABEgl8TvD_BwE [retrieved online Apr. 19, 2023].

\* cited by examiner

ENERGY EFFICIENT SMART MAILBOX

CROSS-REFERENCE

This application claims the benefit of U.S. Provisional Application No. 63/334,402, filed Apr. 25, 2022, which is incorporated herein by reference in its entirety.

BACKGROUND

Smart storage devices may be used as receptacles for packages and mail.

SUMMARY

In some aspects, the present disclosure describes a method for operating a mailbox, the method comprising: detecting a motion in proximity to the mail box; engaging a lock based at least partially on the detecting of the motion; and disengaging the lock after a predetermined amount of time has passed after detecting of the motion, in the absence of detecting additional motion.

In some embodiments, the method further comprises sending a signal to a first wireless communication interface comprising a first data rate, wherein the signal is based at least partially on the detecting of the motion.

In some embodiments, the first wireless communication interface sends the signal to a second wireless communication interface comprising a second data rate, wherein the second data rate is higher than the first data rate.

In some embodiments, the first wireless communication interface has substantially the same wireless communication range than the second wireless communication interface.

In some embodiments, the first wireless communication interface consumes less electrical power that is less than the second wireless communication interface.

In some embodiments, the second wireless communication interface connects to the internet.

In some embodiments, the mailbox device further comprises a battery.

In some embodiments, the mailbox further comprises a solar module in electrical communication with the battery.

In some embodiments, the mailbox further comprises a motion sensor in electrical communication with the battery, wherein the motion sensor is configured to produce a motion signal upon detecting the motion.

In some embodiments, the motion sensor is a passive infrared radiation (PIR) sensor.

In some embodiments, the lock is an electromagnetic lock in electrical communication with the battery and the motion sensor, wherein the electromagnetic lock is configured to receive the motion signal and engage with the door upon receiving the motion signal.

In some embodiments, the electromagnetic lock comprises a relay, wherein the relay is configured to receive the motion signal and create an electrical current through the electromagnetic lock to engage with the door.

In some embodiments, the method further comprises engaging the electromagnetic lock in the event of a failure of the motion sensor.

In some embodiments, the mailbox comprises a second door, wherein the second door is smaller than the first door.

In some embodiments, the mailbox comprises a motor configured to actuate the door.

In some embodiments, the mailbox is configured to optionally receive electrical energy from the grid.

In some aspects, the present disclosure describes a storage device comprising: a housing comprising (i) a door and (ii) a cavity for holding an object; a battery; a motion sensor in electrical communication with the battery, wherein the motion sensor is configured to produce a motion signal upon detecting motion; and an electromagnetic lock in electrical communication with the battery and the motion sensor, wherein the electromagnetic lock is configured to receive the motion signal and engage with the door upon receiving the motion signal.

In some embodiments, the storage device further comprises a solar module in electrical communication with the battery.

In some embodiments, the storage device does not receive power from an electrical grid.

In some embodiments, the storage device further comprises a second door, wherein the second door is smaller than the first door.

In some embodiments, the storage device further comprises a motor configured to actuate the door.

In some embodiments, the storage device further comprises a first wireless communication interface comprising a first data rate, and a second wireless communication interface comprising a second data rate, wherein the second data rate is higher than the first data rate.

In some embodiments, the first wireless communication interface consumes less electrical power that is less than the second wireless communication interface.

In some embodiments, the first wireless communication interface has substantially the same wireless communication range than the second wireless communication interface.

In some embodiments, the second wireless communication interface connects to the internet.

In some embodiments, the storage device further comprises a panel comprising a plurality of buttons.

In some embodiments, the motion sensor is a passive infrared radiation (PIR) sensor.

In some embodiments, the electromagnetic lock is configured to disengage with the door after a predetermined amount of time has passed after receiving the motion signal, in the absence of additional motion signals.

In some embodiments, the storage device is configured to optionally receive electrical energy from the grid.

In some embodiments, the storage device further comprises a potentiometer configured to, in the event of a failure of the motion sensor, to engage the electromagnetic lock.

In some embodiments, the electromagnetic lock comprises a relay, wherein the relay is configured to receive the motion signal and create an electrical current through the electromagnetic lock to engage with the door.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

As online shopping becomes more ubiquitous, there is a need for improved storage devices to support online shopping.

In some parts of the world, a mailbox may need to be placed far from the door step. For example, in some rural areas of the United States it is common to have a driveway extending for over a quarter of a mile, sometimes much longer. Therefore, mailboxes are typically placed next to the road (i.e., at the end of the driveway) in these areas. However, parcels that are left in these mailboxes or otherwise left on the side of the road are vulnerable to theft; distance between neighboring houses in rural areas may stretch for miles. In these situations, thieves may have an increased sense that "no one is watching" because the parcels may be placed very far from any houses and there is little traffic. There is a need for smart storage devices that can be installed at various locations, and the previous example describes one of many situations.

Figure 1:
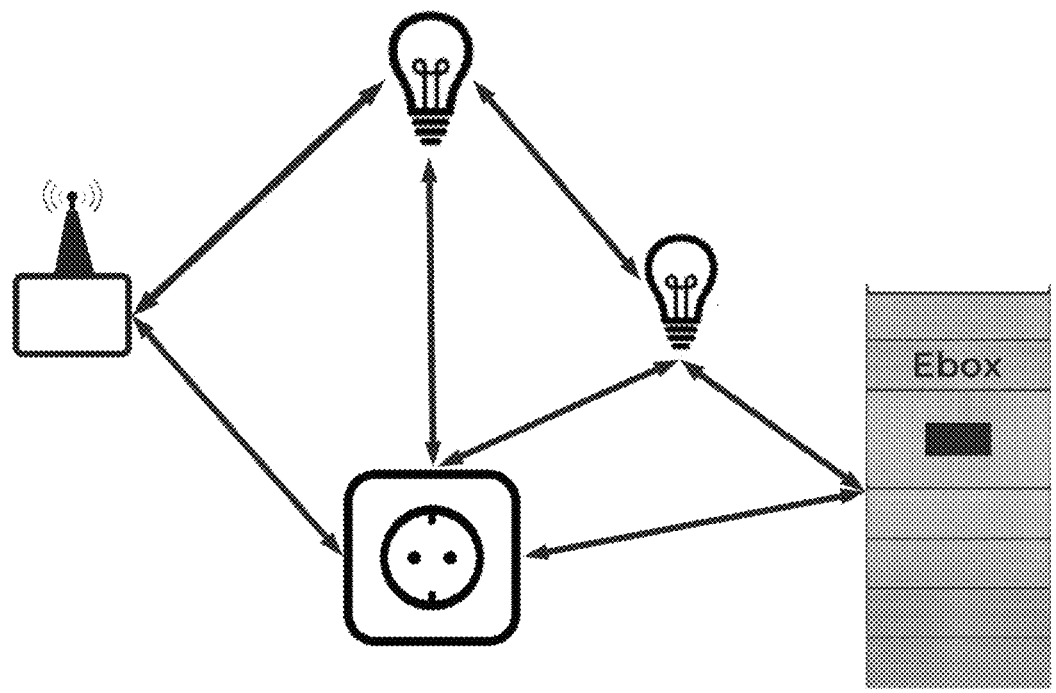
FIG. 1 schematically illustrates a storage device installed near a driveway, in accordance with some embodiments. The antenna illustrates a wireless communication hub, which may be installed within a house. The lightbulbs and the wall plug/socket are smart devices, which may serve as range extenders.
Figure 2:
FIG. 2 shows a storage device, in accordance with some embodiments.

In some aspects, the present disclosure describes a storage device. In some cases, the storage device may comprise a housing. FIG. 2 shows an example of a storage device comprising a housing, in accordance with some embodiments. In some cases, the housing may comprise a door. In some cases, the housing may comprise an opening for depositing objects. In some cases, the housing may comprise a cavity for holding an object. In some cases, the housing may comprise weather-proofing material.

In some cases, the storage device may comprise a battery. In some cases, the battery may be a rechargeable battery. In some cases, the battery be disposed at a bottom portion of the housing. In some cases, the battery may be provided in a battery pack that comprises a plurality of batteries. In some cases, the battery pack may be provided in parallel circuits, series circuits, or a combination thereof.

In some cases, the storage device may comprise a motion sensor. In some cases, the motion sensor may be in electrical communication with the battery. In some cases, the motion sensor is configured to produce a motion signal upon detecting motion through heat.

In some cases, the storage device may comprise an electromagnetic lock. In some cases, the electromagnetic lock may be in electrical communication with the battery. In some cases, the electromagnetic lock may be in electrical communication the motion sensor. In some cases, the electromagnetic lock is configured to receive the motion signal and engage with the door upon receiving the motion signal.

In some cases, the storage device may comprise a solar module in electrical communication with the battery. In some cases, the storage device may comprise a plurality of solar modules in electrical communication with the battery. In some cases, the plurality of solar modules may be disposed as a portion of the housing. In some cases, the plurality of solar modules may be disposed at a distinct and removed location from the housing.

In some cases, the electromagnetic lock is configured to disengage with the door after a predetermined amount of time has passed after receiving the motion signal. In some cases, the electromagnetic lock is configured to disengage with the door after a predetermined amount of time has passed after receiving the motion signal, in the absence of additional motion signals. In some cases, the predetermined amount of time comprises at least about 1, 2, 3, 4, 5, 6, 7, 8, 9, 10, 20, 30, 40, 50, 60, 70, 80, 90, 100, 200, 300, 400, 500, 600, 700, 800, 900, or 1000 microseconds. In some cases, the predetermined amount of time comprises at least about 1, 2, 3, 4, 5, 6, 7, 8, 9, 10, 20, 30, 40, 50, 60, 70, 80, 90, 100, 200, 300, 400, 500, 600, 700, 800, 900, or 1000 milliseconds. In some cases, the predetermined amount of time comprises at least about 1, 2, 3, 4, 5, 6, 7, 8, 9, 10, 20, 30, 40, 50, or 60 minutes. In some cases, the predetermined amount of time comprises at most about 1, 2, 3, 4, 5, 6, 7, 8, 9, 10, 20, 30, 40, 50, 60, 70, 80, 90, 100, 200, 300, 400, 500, 600, 700, 800, 900, or 1000 microseconds. In some cases, the predetermined amount of time comprises at most about 1, 2, 3, 4, 5, 6, 7, 8, 9, 10, 20, 30, 40, 50, 60, 70, 80, 90, 100, 200, 300, 400, 500, 600, 700, 800, 900, or 1000 milliseconds. In some cases, the predetermined amount of time comprises at most about 1, 2, 3, 4, 5, 6, 7, 8, 9, 10, 20, 30, 40, 50, or 60 minutes.

In some cases, various features of the storage device may harmonize to reduce the power consumption of the storage device. For example, by having the electromagnetic lock engage only when necessary (e.g., when a motion is detected), the amount of energy consumed by the storage device can be minimized. Individual components of the storage device, such as the battery, the motion sensor, the electromagnetic lock, and etc. may be sized, selected, or designed to have minimal power consumption. For example, in some cases, the motion sensor may be a passive infrared radiation (PIR) sensor.

In some cases, the storage device does not receive power from an electrical grid. In some cases, the storage device may be able to operate using its own power source, e.g., the battery and/or the solar module, for weeks, months, or years. In some cases, the storage device may be configured to optionally receive electrical energy from the grid.

In some cases, the storage device comprises a first wireless communication interface comprising a first data rate. In some cases, the storage device comprises a second wireless communication interface comprising a second data rate, wherein the second data rate is higher than the first data rate. In some cases, the first wireless communication interface consumes less electrical power that is less than the second wireless communication interface. In some cases, the first wireless communication interface has substantially the same wireless communication range than the second wireless communication interface. In some cases, the second wireless communication interface connects to the internet.

In some cases, the first wireless communication interface may consume zero or near-zero electrical energy while inactive. In some cases, the first wireless communication interface may follow an established communication protocol, such as Zigbee protocol. The first wireless communication protocol, which can be simple and low bandwidth, can allow the storage device to communicate with other electronic devices at a low energy cost.

In some cases, the first wireless communication interface, the second wireless communication interface, or both may be in communication with an electronic device disposed within a home. In some cases, the communication may comprise using range extenders. In some cases, the range extender may be an internet-of-things device. In some cases, the range extender may be disposed in or form a portion of various household electronic devices, including: electrical sockets, computers, mobile phones, lightbulbs, toilets, garage doors, home security systems, refrigerators, microwaves, laundry machines, or any combination thereof.

In some cases, the storage device comprises a potentiometer configured to, in the event of a failure of the motion sensor, to engage a lock. In some cases, this fail-safe mechanism may allow for parcels to be secured for in the event of failure of a component of the storage device, e.g., running out of battery. In some cases, the mailbox may comprise a secured door that can be opened manually. In some cases, the secured door may be opened using a key lock.

In some cases, the electromagnetic lock comprises a relay, wherein the relay is configured to receive the motion signal and create an electrical current through the electromagnetic lock to engage with the door. In some cases, the storage device comprises a panel comprising a plurality of buttons. In some cases, the plurality of buttons may be comprise numeric, alphabetic, or alphanumeric buttons. In some cases, the plurality of buttons may be configured to receive a password by a user. In some cases, the plurality of buttoms may be in electrical communication with a logical circuit, that when a correct password is entered, actuates the electromagnetic lock such that contents of the storage unit may be accessed.

The storage device may be configured to store parcels of various shapes and sizes. In some cases, a parcel may be paper mail, magazine, or packages. In some cases, the storage device may store any combination thereof. In some cases, the storage device may comprise a door for receiving the parcels of various shapes and sizes. In some cases, the mailbox may comprise a door for receiving a package. In some cases, the storage device comprises a second door, wherein the second door is smaller than the first door. In some cases, the mailbox may be connected to a hub. In some cases, the mailbox may comprise a panel for entering a password. In some cases, the storage device comprises a motor configured to actuate the door.

The mailbox may be installed or otherwise placed at various locations. In some cases, the mailbox may be installed in proximity to a road, to make delivery facile.

In some aspects, the present disclosure describes a method for operating a mailbox. In some cases, the method comprises detecting a motion in proximity to the mail box. In some cases, the method comprises engaging a lock based at least partially on the detecting of the motion. In some cases, the method comprises disengaging the lock after a predetermined amount of time has passed after detecting of the motion, in the absence of detecting additional motion.

In some cases, the method may further comprise sending a signal to a first wireless communication interface comprising a first data rate. In some cases, the signal is based at least partially on the detecting of the motion. In some cases, the first wireless communication interface may be a communication interface that consumes minimal energy. In some cases, the first wireless communication interface may remain inactive until a motion is detected. In some cases, the first wireless communication interface may consume zero or near-zero electrical energy while inactive. In some cases, the first wireless communication interface sends the signal to a second wireless communication interface comprising a second data rate. In some cases, the second data rate is higher than the first data rate. In some cases, the first wireless communication interface has substantially the same wireless communication range than the second wireless communication interface. In some cases, the first wireless communication interface consumes less electrical power than the second wireless communication interface. In some cases, the second wireless communication interface connects to the internet.

In some cases, the mailbox comprises a solar energy system. In some cases, the solar energy system can allow the mailbox to operate without having to change batteries or without using grid energy. In some cases, the mailbox comprises a rechargeable battery. In some cases, the mailbox comprises a solar module in electrical communication with the battery.

In some cases, the mailbox comprises a motion sensor in electrical communication with the battery. In some cases, the motion sensor is configured to produce a motion signal upon detecting the motion. In some cases, the battery may be configured to be able to power the motion sensor for at least about 1 week, 2 weeks, 3 weeks, 1 month, 2 months, 3 months, 4 months, 5 months, or 6 months on full charge. In some cases, the motion sensor is a passive infrared radiation (PIR) sensor. In some cases, the motion sensor has low power draw.

In some cases, the lock is an electromagnetic lock in electrical communication with the battery and the motion sensor, wherein the electromagnetic lock is configured to receive the motion signal and engage with the door upon receiving the motion signal. In some cases, the electromagnetic lock consumes zero or near zero electrical energy while it is not engaged. In some cases, the electromagnetic lock comprises a relay, wherein the relay is configured to receive the motion signal and create an electrical current through the electromagnetic lock to engage with the door.

Computer Systems

Figure 3:
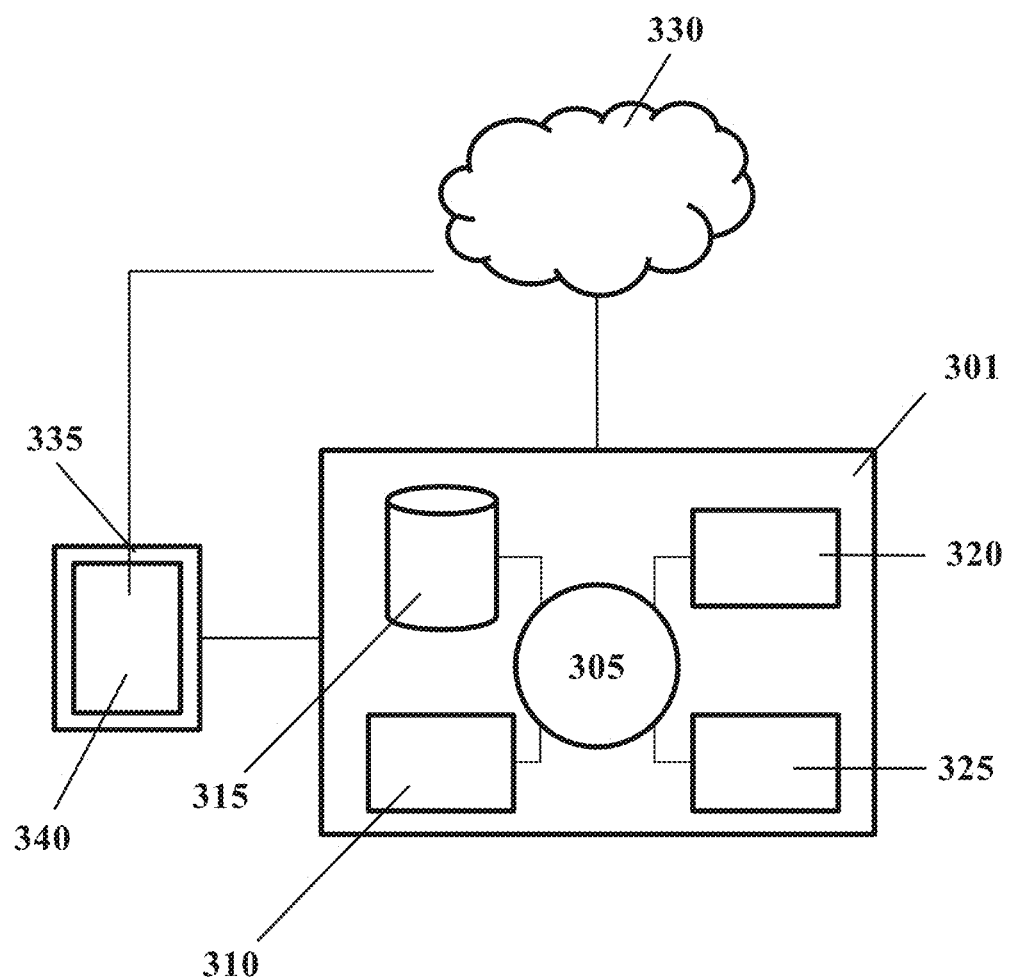
FIG. 3 shows a computer system, in accordance with some embodiments.

The present disclosure provides computer systems that are programmed to implement methods of the disclosure. FIG. 3 shows a computer system 301 that is programmed or otherwise configured to, for example, engaging or disengaging a lock.

The computer system 301 may regulate various aspects of analysis, calculation, and generation of the present disclosure, such as, for example, engaging or disengaging a lock. The computer system 301 may be an electronic device of a user or a computer system that is remotely located with respect to the electronic device. The electronic device may be a mobile electronic device.

The computer system 301 includes a central processing unit (CPU, also "processor" and "computer processor" herein) 305, which may be a single core or multi core processor, or a plurality of processors for parallel processing. The computer system 301 also includes memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communication bus (solid lines), such as a motherboard. The storage unit 315 may be a data storage unit (or data repository) for storing data. The computer system 301 may be operatively coupled to a computer network ("network") 330 with the aid of the communication interface 320. The network 330 may be the Internet, an internet and/or extranet, or an intranet and/or extranet that is in communication with the Internet.

The network 330 in some cases is a telecommunication and/or data network. The network 330 may include one or more computer servers, which may enable distributed computing, such as cloud computing. For example, one or more computer servers may enable cloud computing over the network 330 ("the cloud") to perform various aspects of analysis, calculation, and generation of the present disclosure, such as, for example, engaging or disengaging a lock. Such cloud computing may be provided by cloud computing platforms such as, for example, Amazon Web Services (AWS), Microsoft Azure, Google Cloud Platform, and IBM cloud. The network 330, in some cases with the aid of the computer system 301, may implement a peer-to-peer network, which may enable devices coupled to the computer system 301 to behave as a client or a server.

The CPU 305 may comprise one or more computer processors and/or one or more graphics processing units (GPUs). The CPU 305 may execute a sequence of machine-readable instructions, which may be embodied in a program or software. The instructions may be stored in a memory location, such as the memory 310. The instructions may be directed to the CPU 305, which may subsequently program or otherwise configure the CPU 305 to implement methods of the present disclosure. Examples of operations performed by the CPU 305 may include fetch, decode, execute, and writeback.

The CPU 305 may be part of a circuit, such as an integrated circuit. One or more other components of the system 301 may be included in the circuit. In some cases, the circuit is an application specific integrated circuit (ASIC).

The storage unit 315 may store files, such as drivers, libraries and saved programs. The storage unit 315 may store user data, e.g., user preferences and user programs. The computer system 301 in some cases may include one or more additional data storage units that are external to the computer system 301, such as located on a remote server that is in communication with the computer system 301 through an intranet or the Internet.

The computer system 301 may communicate with one or more remote computer systems through the network 330. For instance, the computer system 301 may communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user may access the computer system 301 via the network 330.

Methods as described herein may be implemented by way of machine (e.g., computer processor) executable code stored on an electronic storage location of the computer system 301, such as, for example, on the memory 310 or electronic storage unit 315. The machine executable or machine readable code may be provided in the form of software. During use, the code may be executed by the processor 305. In some cases, the code may be retrieved from the storage unit 315 and stored on the memory 310 for ready access by the processor 305. In some situations, the electronic storage unit 315 may be precluded, and machine-executable instructions are stored on memory 310.

The code may be pre-compiled and configured for use with a machine having a processor adapted to execute the code, or may be compiled during runtime. The code may be supplied in a programming language that may be selected to enable the code to execute in a pre-compiled or as-compiled fashion.

Aspects of the systems and methods provided herein, such as the computer system 201, may be embodied in programming. Various aspects of the technology may be thought of as "products" or "articles of manufacture" typically in the form of machine (or processor) executable code and/or associated data that is carried on or embodied in a type of machine readable medium. Machine-executable code may be stored on an electronic storage unit, such as memory (e.g., read-only memory, random-access memory, flash memory) or a hard disk. "Storage" type media may include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 301 may include or be in communication with an electronic display 335 that comprises a user interface (UI) 340 for providing, for example, identifying a storage device, entering a password, or notifying delivery. Examples of UIs include, without limitation, a graphical user interface (GUI) and web-based user interface.

Methods and systems of the present disclosure may be implemented by way of one or more algorithms. An algorithm may be implemented by way of software upon execution by the central processing unit 305. The algorithm can, for example, provide encrypted messages that enable authorizing opening of a storage device.

LIST OF EMBODIMENTS

The following list of embodiments of the invention are to be considered as disclosing various features of the invention, which features can be considered to be specific to the particular embodiment under which they are discussed, or which are combinable with the various other features as listed in other embodiments. Thus, simply because a feature is discussed under one particular embodiment does not necessarily limit the use of that feature to that embodiment.

Embodiment 1. A method for operating a mailbox, the method comprising: (a) detecting a motion in proximity to the mail box; (b) engaging a lock based at least partially on the detecting of the motion; and (c) disengaging the lock after a predetermined amount of time has passed after detecting of the motion, in the absence of detecting additional motion.

Embodiment 2. The method of embodiment 1, further comprising sending a signal to a first wireless communication interface comprising a first data rate, wherein the signal is based at least partially on the detecting of the motion.

Embodiment 3. The method of embodiment 2, wherein the first wireless communication interface sends the signal to a second wireless communication interface comprising a second data rate, wherein the second data rate is higher than the first data rate.

Embodiment 4. The method of embodiment 3, wherein the first wireless communication interface has substantially the same wireless communication range than the second wireless communication interface.

Embodiment 5. The method of embodiment 4, wherein the first wireless communication interface consumes less electrical power that is less than the second wireless communication interface.

Embodiment 6. The method of embodiment 5, wherein the second wireless communication interface connects to the internet.

Embodiment 7. The method of embodiment 1, wherein the mailbox device further comprises a battery.

Embodiment 8. The method of embodiment 7, wherein the mailbox further comprises a solar module in electrical communication with the battery.

Embodiment 9. The method of embodiment 8, wherein the mailbox further comprises a motion sensor in electrical communication with the battery, wherein the motion sensor is configured to produce a motion signal upon detecting the motion.

Embodiment 10. The method of embodiment 9, wherein the motion sensor is a passive infrared radiation (PIR) sensor.

Embodiment 11. The method of embodiment 10, wherein the lock is an electromagnetic lock in electrical communication with the battery and the motion sensor, wherein the electromagnetic lock is configured to receive the motion signal and engage with the door upon receiving the motion signal.

Embodiment 12. The method of embodiment 11, wherein the electromagnetic lock comprises a relay, wherein the relay is configured to receive the motion signal and create an electrical current through the electromagnetic lock to engage with the door.

Embodiment 13. The method of embodiment 12, further comprising engaging the electromagnetic lock in the event of a failure of the motion sensor.

Embodiment 14. The method of embodiment 1, wherein the mailbox comprises a second door, wherein the second door is smaller than the first door.

Embodiment 15. The method of embodiment 1, wherein the mailbox comprises a motor configured to actuate the door.

Embodiment 16. The method of embodiment 1, wherein the mailbox is configured to optionally receive electrical energy from the grid.

Embodiment 17. A storage device comprising: (a) a housing comprising (i) a door and (ii) a cavity for holding an object; (b) a battery; (c) a motion sensor in electrical communication with the battery, wherein the motion sensor is configured to produce a motion signal upon detecting motion; and (d) an electromagnetic lock in electrical communication with the battery and the motion sensor, wherein the electromagnetic lock is configured to receive the motion signal and engage with the door upon receiving the motion signal.

Embodiment 18. The storage device of embodiment 17, further comprising a solar module in electrical communication with the battery.

Embodiment 19. The storage device of embodiment 18, wherein the storage device does not receive power from an electrical grid.

Embodiment 20. The storage device of embodiment 17, further comprising a second door, wherein the second door is smaller than the first door.

Embodiment 21. The storage device of embodiment 17, further comprising a motor configured to actuate the door.

Embodiment 22. The storage device of embodiment 17, further comprising a first wireless communication interface comprising a first data rate, and a second wireless communication interface comprising a second data rate, wherein the second data rate is higher than the first data rate.

Embodiment 23. The storage device of embodiment 22, wherein the first wireless communication interface consumes less electrical power that is less than the second wireless communication interface.

Embodiment 24. The storage device of embodiment 23, wherein the first wireless communication interface has substantially the same wireless communication range than the second wireless communication interface.

Embodiment 25. The storage device of embodiment 24, wherein the second wireless communication interface connects to the internet.

Embodiment 26. The storage device of embodiment 17, further comprising a panel comprising a plurality of buttons.

Embodiment 27. The storage device of embodiment 17, wherein the motion sensor is a passive infrared radiation (PIR) sensor.

Embodiment 28. The storage device of embodiment 17, wherein the electromagnetic lock is configured to disengage with the door after a predetermined amount of time has passed after receiving the motion signal, in the absence of additional motion signals.

Embodiment 29. The storage device of embodiment 17, wherein the storage device is configured to optionally receive electrical energy from the grid.

Embodiment 30. The storage device of embodiment 17, further comprising a potentiometer configured to, in the event of a failure of the motion sensor, to engage the electromagnetic lock.

Embodiment 31. The storage device of embodiment 17, wherein the electromagnetic lock comprises a relay, wherein the relay is configured to receive the motion signal and create an electrical current through the electromagnetic lock to engage with the door.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the present disclosure may be employed in practicing the present disclosure. It is intended that the following claims define the scope of the present disclosure and that methods and structures within the scope of these claims and their equivalents be covered thereby.

What is claimed is:

1. A method for operating a mailbox, the method comprising:
  a. detecting a motion in proximity to the mail box;
  b. engaging a lock based at least partially on the detecting of the motion; and
  c. disengaging the lock after a predetermined amount of time has passed after detecting of the motion, in the absence of detecting additional motion.

2. The method of claim 1, further comprising sending a signal to a first wireless communication interface comprising a first data rate, wherein the signal is based at least partially on the detecting of the motion.

3. The method of claim 2, wherein the first wireless communication interface sends the signal to a second wireless communication interface comprising a second data rate, wherein the second data rate is higher than the first data rate.

4. The method of claim 3, wherein the first wireless communication interface has substantially the same wireless communication range than the second wireless communication interface.

5. The method of claim 4, wherein the first wireless communication interface consumes less electrical power that is less than the second wireless communication interface.

6. The method of claim 5, wherein the second wireless communication interface connects to the internet.

7. The method of claim 1, wherein the mailbox further comprises a battery.

8. The method of claim 7, wherein the mailbox further comprises a solar module in electrical communication with the battery.

9. The method of claim 8, wherein the mailbox further comprises a motion sensor in electrical communication with the battery, wherein the motion sensor is configured to produce a motion signal upon detecting the motion.

10. The method of claim 9, wherein the lock is an electromagnetic lock in electrical communication with the battery and the motion sensor, wherein the electromagnetic lock is configured to receive the motion signal and engage with the door upon receiving the motion signal.

11. The method of claim 10, wherein the electromagnetic lock comprises a relay, wherein the relay is configured to receive the motion signal and create an electrical current through the electromagnetic lock to engage with the door.

12. The method of claim 11, further comprising engaging the electromagnetic lock in the event of a failure of the motion sensor.

* * * * *